June 17, 1930. C. SIFTON Re. 17,704

VARIABLE SPEED TRANSMISSION

Original Filed Nov. 9, 1927

Inventor
C. Sifton
by J. Edw. Maybee
ATTY.

Reissued June 17, 1930

Re. 17,704

UNITED STATES PATENT OFFICE

CLIFFORD SIFTON, OF TORONTO, ONTARIO, CANADA

VARIABLE-SPEED TRANSMISSION

Original No. 1,703,178, dated February 26, 1929, Serial No. 232,133, filed November 9, 1927. Application for reissue filed November 18, 1929. Serial No. 408,127.

My invention relates to improvements in variable speed transmissions, and the object of the invention is to devise a compact easily controlled transmission mechanism by arranging such mechanism concentrically around axially aligned driving and driven members, to devise a transmission in which the driving ratios may be gradually and smoothly varied between the maximum and minimum, in which the direct drive is effected without internal friction in the connecting mechanism, and therefore the loss of energy and wear between the parts reduced and the life of the parts increased, in which under direct drive conditions there is no pressure exerted from an outside source, and in which during the operation of changing speed the pressure controlling such changes is entirely under the control of the operator so that any amount of pressure and consequent speed change may be attained and held, and it consists essentially of the arrangement and construction of parts as hereinafter more particularly explained.

In the drawings like characters of reference indicate corresponding parts in each figure.

Figure 1:
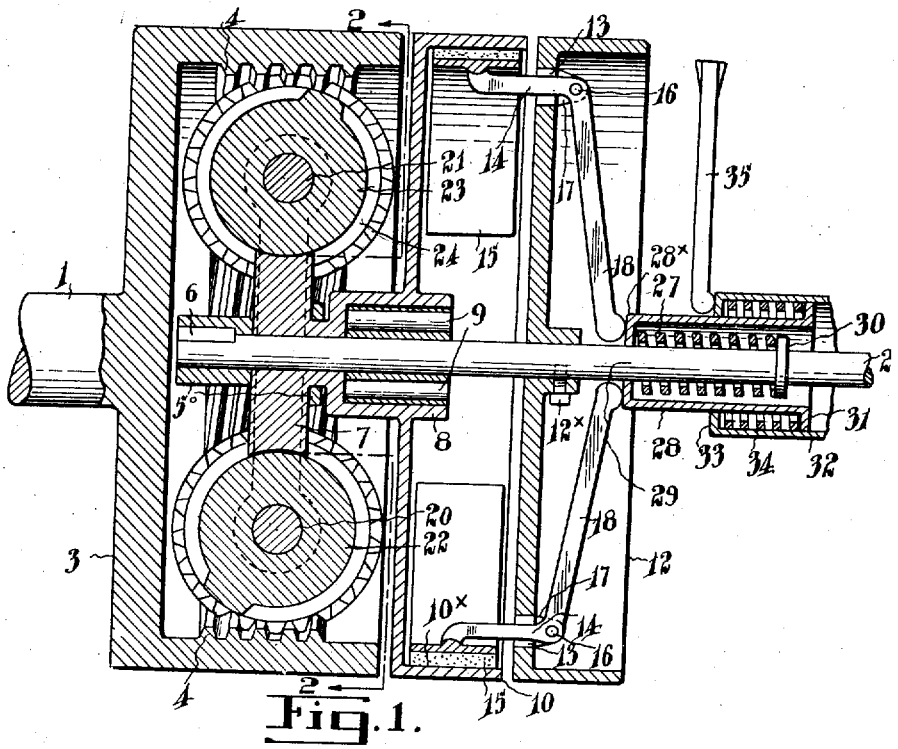
Fig. 1 is a longitudinal sectional view through my transmission mechanism.
Figure 2:
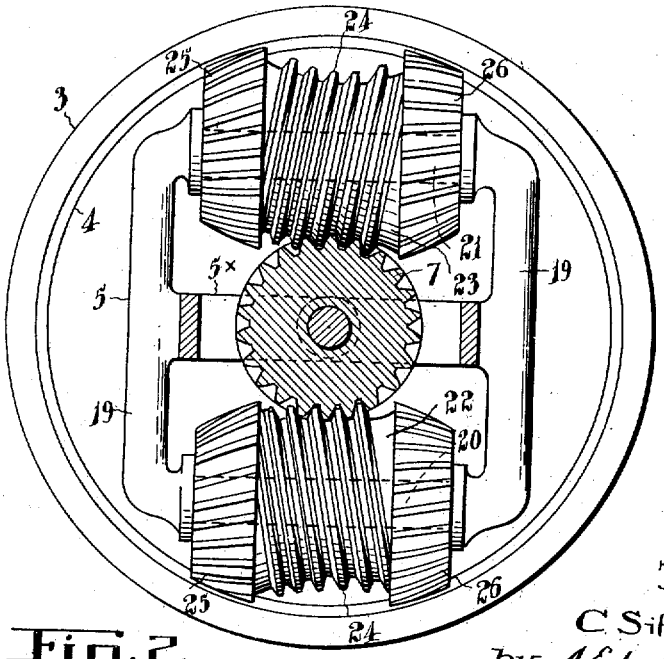
Fig. 2 is a transverse sectional view on line 2—2 Figure 1.

1 indicates the drive shaft and 2 the driven shaft, the drive and driven shafts being in axial alignment one with the other. 3 is a cylindrical member mounted concentrically on the end of the drive shaft adjacent the opposing end of the driven shaft and provided with an internal worm gear 4. 5 is a spider provided with a diametrically extending portion $5^x$ provided with a bearing portion $5^o$, see Figure 1, in which the driven shaft is keyed as indicated at 6.

The portion $5^x$ is formed into a frame between the members of which is freely mounted an external worm gear 7 formed integral with the bearing sleeve member 8 which is preferably provided with roller bearings 9 extending around the driven shaft 2 so as to revolve around the same.

The portion $5^x$ of the spider 5 is provided at its ends with transverse portions 19 extending to each side of the portion $5^x$ and connected together at their ends by transverse bearing portions 20 and 21 on which are mounted planetary gears 22 and 23, each planetary gear being provided with a worm thread 24, extending circumferentially around the same so as to engage with the worm gear 7 at diametrically opposite points, and at its ends provided with substantially longitudinally extending worm gears 25 and 26 engaging the internal worm 4 of the member 3. This specific construction of the planetary gears is of great importance since I am enabled to give the worms 20, 21 a longitudinally concave form which gives a much greater arc of contact with the worm gear 7 than is possible with a straight gear, and at the same time I secure ample meshing surface with the internal worm 4 by means of the offset end worm gears 25 and 26.

10 is a cylindrical member formed integral with or connected to the external worm gear 7, the rim $10^x$ of which cylindrical member provides an internal annual friction surface to form one member of a friction clutch device. 12 is a supporting member secured to the driven shaft as indicated at $12^x$ and provided with orifices 13 through which clutch arms 14 extend provided with friction shoes 15 bearing against the inner face of the friction surface $10^x$. The arms 14 are pivotally mounted as indicated at 16 upon brackets 17 carried by the supporting member 12, such arms being also provided with inwardly extending outwardly inclined portions 18 terminating at their inner ends in proximity to the driven shaft 2, the arms being arranged concentrically around such driven shaft. By means of this clutch the external worm gear 7 may be locked to the driven shaft or any desired slip allowed.

It will be seen that, when the friction shoes 15 are pressed so firmly into contact with the friction surface of the rim $10^x$ as to lock the external worm gear 7 to the driven shaft 2, the planetary gears cannot rotate on their axes, and they are thus carried in an orbit about the external worm gear carrying with them the spider 5 and with it the driven shaft 2 through the keyed connection 6.

The shoes 15 may be held in engagement with the friction surface $10^x$ either by means of the contrifugal force exerted on the shoes or by spring pressure, such as indicated at 27 against the inner ends of the members 18 or the arms 14.

In order to vary the driving ratios between the driving and driven members I vary the spring pressure exerted by the spring 27 upon the shoes 15.

28 is a cylindrical housing containing the spring 27 and provided with a closed end $28^x$ through an opening 29 in which the driven shaft 2 extends. One end of the spring 27 bears against the collar 30 and the opposite end of the spring 27 against the end $28^x$ of the housing 28. The housing 28 is provided with an out-turned annular flange 31. 32 is an outer sleeve surrounding the sleeve 28 and the flange 31 and provided with an inner closed end 33 through which the sleeve 28 extends. Between the closed end 33 and the flange 31 is inserted a pressure spring 34 opposing the spring 27. 35 is a controlling lever bearing against the closed end 33 of the sleeve 32.

It will thus be seen that as the operating lever 35 is swung against the end of the sleeve 32 the spring 34 will be compressed so as to gradually build up a pressure opposing the pressure of the spring 27 and will therefore very gradually and slowly relieve the pressure of the spring 27 against the arm members 18 and thereby very slowly reduce the pressure of the friction shoes 15 against the internal friction surface $10^x$ and thereby allow for slippage of the member 10 in proportion to the amount of the reduced pressure of the shoes 15 against the friction surface $10^x$, permitting the worm gear 7 to also proportionately revolve and thereby reduce the driving effect of the planetary gears 22 and 23 and their travel around such worm gear so as to reduce the transmitting force carried therethrough from the drive to the driven shaft.

It will thus be seen that as the pressure of the shoes 15 against the friction surface $10^x$ is reduced the drive will be increased through to the member $10^x$ and the drive through the spider 5 comprising the members $5^o$, $5^x$, 19, 20 and 21 will be reduced by the decreasing tendency of the planetary gears to travel around the worm gear 7 owing to its increase in rotation, the leverage between the planetary gears 22 and 23 and the worm gear 7 being reduced by the release of the worm gear 7 to travel more or less freely around the driven shaft and consequently the speed of the spider 5 and the driven shaft to which it is keyed is reduced.

It will therefore be seen from this description that when there is a one to one ratio drive between the drive and driven shafts, or in other words a direct drive of the driving mechanism, they will be locked together so that the parts of the gear are held motionless with respect to each other so that there will be no relative motion and therefore all gear friction will be eliminated.

It will therefore be seen that by my construction the gear ratio may be gradually, evenly and smoothly reduced or increased to any extent desired so as to provide any gear ratio desired without any jumping from one definite gear ratio to another, that all the parts are arranged concentrically around the axially aligned drive and driven shafts, therefore providing a device which is compact, balanced and readily controlled by the operator, that under direct drive conditions the parts of the device are held in driving connection by pressure between relatively non-rotating parts, and that such pressure can be readily varied by the operator to produce any driving ratio desired.

It may also be pointed out that in the planetary gears the worm threads of such gears may be reversed so as to reverse the rotation of the worm gear 7 to revolve in an opposite direction to the direction of rotation of the driving shaft.

What I claim as my invention is:

1. In a variable speed transmission mechanism the combination of alined driving and driven shafts; an internal worm secured to the driving shaft; an external worm gear mounted freely on the driven shaft; a frame secured to the driven shaft; a planetary gear mounted on said frame to mesh with the worm gears of the shafts, said planetary gear comprising a central worm meshing with the external worm gear, and end worm gears meshing with the internal worm; a friction clutch member connected to the external worm gear; a shoe co-acting with the said clutch member; and means for varying the pressure of the shoe.

2. In a variable speed transmission mechanism, the combination with the driving and a driven shaft; of a planetary gear system having a gear connected to the driving shaft and a gear mounted freely upon the driven shaft, a frame secured to the driven shaft in which the planetary gears are mounted to engage the shaft gears of the system, a friction clutch member connected to the centre gear to revolve in unison therewith, a supporting member carried by the driven shaft, an opposing clutch member mounted thereon, a cylindrical sleeve mounted upon the driven shaft and bearing against the opposing clutch members to force them into engagement, an abutment on the driven shaft, a spring interposed between the abutment and the inner ends of the sleeve, an abutment carried by the sleeve, an outer sleeve surrounding the aforesaid sleeve, a spring inserted between the abutment of such sleeve and the end of the outer sleeve, and a lever adapted to engage the outer sleeve to compress the last mentioned spring.

3. The combination of two longitudinally aligned shafts; an internal worm carried by one shaft; an external worm gear carried by the other shaft; a frame secured to the shaft carrying the external worm gears; interposed planetary gears revolvably mounted in the frame with their axes at right angles to the axis of the aforesaid gears each having a central worm section engaging the external worm gear and end gears engaging the internal worm; and a friction clutch device for controlling the rotation of the external worm gear.

4. The combination of two longitudinally alined shafts; an internal worm secured to one shaft; an external worm gear carried by the other shaft; a frame secured to the shaft carrying the external worm gear; a planetary gear revolubly mounted on said frame with its axis in a plane at right angles to said shafts, said gear comprising a part meshing with the external worm gear and a part offset laterally from the aforesaid part and meshing solely with the internal worm; and a friction clutch device for controlling the rotation of the external worm gear.

5. In a variable speed transmission mechanism the combination of a driving and a driven shaft; an internal gear wheel secured to the driving shaft; an external gear wheel loose on the driven shaft; a planetary gear system interposed between said gears; a friction disk secured to the external gear; and means carried by and rotating with the driven shaft for applying a variable friction to the said disk to lock the external gear to the driven shaft or permit a varying degree of slip.

Signed at Toronto, Canada, this 14th day of November, 1929.

CLIFFORD SIFTON.